US012179487B2

(12) United States Patent
Tanaka

(10) Patent No.: US 12,179,487 B2
(45) Date of Patent: Dec. 31, 2024

(54) LIQUID DISCHARGE APPARATUS

(71) Applicant: BROTHER KOGYO KABUSHIKI KAISHA, Nagoya (JP)

(72) Inventor: Taiki Tanaka, Yokkaichi (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 70 days.

(21) Appl. No.: 17/938,122

(22) Filed: Oct. 5, 2022

(65) Prior Publication Data

US 2023/0150261 A1 May 18, 2023

(30) Foreign Application Priority Data

Nov. 18, 2021 (JP) ................................ 2021-187626

(51) Int. Cl.
*B41J 2/14* (2006.01)

(52) U.S. Cl.
CPC .. *B41J 2/14201* (2013.01); *B41J 2002/14306* (2013.01); *B41J 2002/14419* (2013.01)

(58) Field of Classification Search
CPC .......... B41J 2/14201; B41J 2002/14306; B41J 2002/14419; B41J 2002/14459; B41J 2202/12; B41J 2/14233
See application file for complete search history.

(56) References Cited

U.S. PATENT DOCUMENTS 11,077,663 B2 * 8/2021 Hirai ...................... B41J 2/1433
2020/0307197 A1 10/2020 Hirai et al.

FOREIGN PATENT DOCUMENTS

JP 2020168853 A 10/2020

* cited by examiner

*Primary Examiner* — Justin Seo
*Assistant Examiner* — Tracey M Mcmillion
(74) *Attorney, Agent, or Firm* — Scully, Scott, Murphy & Presser, P.C.

(57) ABSTRACT

A liquid discharge apparatus includes: liquid channels each including an individual channel having a nozzle, a supply manifold connected to the individual channel to supply liquid to the individual channel, and a return manifold connected to the individual channel, along which the liquid that has not been discharged from the nozzle flows; and bypasses each connected to the supply manifold and the return manifold. The liquid channels include a first liquid channel, a second liquid channel, and a third liquid channel arranged in a first direction. The supply manifold of the first liquid channel is connected via a first bypass of the bypasses, only to the return manifold of the second liquid channel. The return manifold of the first liquid channel is connected via a second bypass of the bypass, only to the supply manifold of the third liquid channel.

10 Claims, 12 Drawing Sheets

LIQUID DISCHARGE APPARATUS

REFERENCE TO RELATED APPLICATIONS

This application claims priority from Japanese Patent Application No. 2021-187626 filed on Nov. 18, 2021. The entire content of the priority application is incorporated herein by reference.

BACKGROUND ART

There is known a liquid discharge apparatus including: a first supply manifold and first return manifold which are connected to a first individual channel; and a second supply manifold and second return manifold which are connected to a second individual channel. The first supply manifold and the second return manifold are connected by a first bypass route. The first individual channel has a first nozzle discharge port, and, due to pressure that has been applied from a piezoelectric body to liquid in the first individual channel, the liquid is discharged from the first nozzle discharge port.

DESCRIPTION

In this kind of liquid discharge apparatus, the first supply manifold is connected to the first return manifold by the first individual channel. A pressure wave that has been applied to the liquid in the first individual channel from the piezoelectric body will propagate to the first supply manifold and will propagate to the first return manifold. Supposing the first supply manifold and the first return manifold to be connected by a bypass route, a wave of large amplitude will be generated as a result that the pressure wave propagating to the first supply manifold and pressure wave propagating to the first return manifold are superimposed in phase via the bypass route. As a result, there will occur crosstalk whereby discharge of the liquid from nozzle discharge ports of surrounding individual channels will become unstable. In contrast, in the above-described liquid discharge apparatus, the first supply manifold is connected to the second return manifold by the first bypass route. As a result, the pressure wave propagating to the first supply manifold and pressure wave propagating to the first return manifold (that is in phase with the pressure wave propagating to the first supply manifold) will not merge, hence crosstalk will be reduced.

However, in the case of the above-described liquid discharge apparatus further including a third supply manifold and a third return manifold which are connected by a third individual channel, the first supply manifold will be connected by bypass routes to the second return manifold and the third return manifold. In contrast, each of the second supply manifold and the third supply manifold will be connected by a bypass route to the first return manifold. In this way, the number of the bypass routes of the first supply manifold will differ from other manifolds, and liquid flow rate in the first supply manifold will differ from in other manifolds. There is a risk that difference in flow rates among the manifolds will cause nonuniformity of head heat-dissipating performance and bubble discharge performance.

The present teaching, which was made in view of such circumstances, has an object of providing a liquid discharge apparatus enabling uniformity of flow rates of liquid in manifolds to be achieved, while crosstalk is reduced.

According to an aspect of the present teaching, there is provided a liquid discharge apparatus including: a plurality of liquid channels each including: an individual channel having a nozzle; a supply manifold connected to the individual channel to supply liquid to the individual channel; and a return manifold connected to the individual channel, the liquid that has not been discharged from the nozzle being flowed through the return manifold; and a plurality of bypasses each connected to the supply manifold and the return manifold to cause the liquid to flow therethrough, wherein the liquid channels include a first liquid channel, a second liquid channel, and a third liquid channel arranged in a first direction, the supply manifold included in the first liquid channel is connected only to the return manifold included in the second liquid channel, via a first bypass included in the bypasses, and the return manifold included in the first liquid channel is connected only to the supply manifold included in the third liquid channel, via a second bypass included in the bypasses.

An embodiment of the present teaching will be specifically described below with reference to the drawings. Note that hereafter, identical or corresponding elements will be assigned with identical reference symbols in all of the drawings, and duplicated descriptions thereof omitted.

<Liquid Discharge Apparatus>

Figure 1:
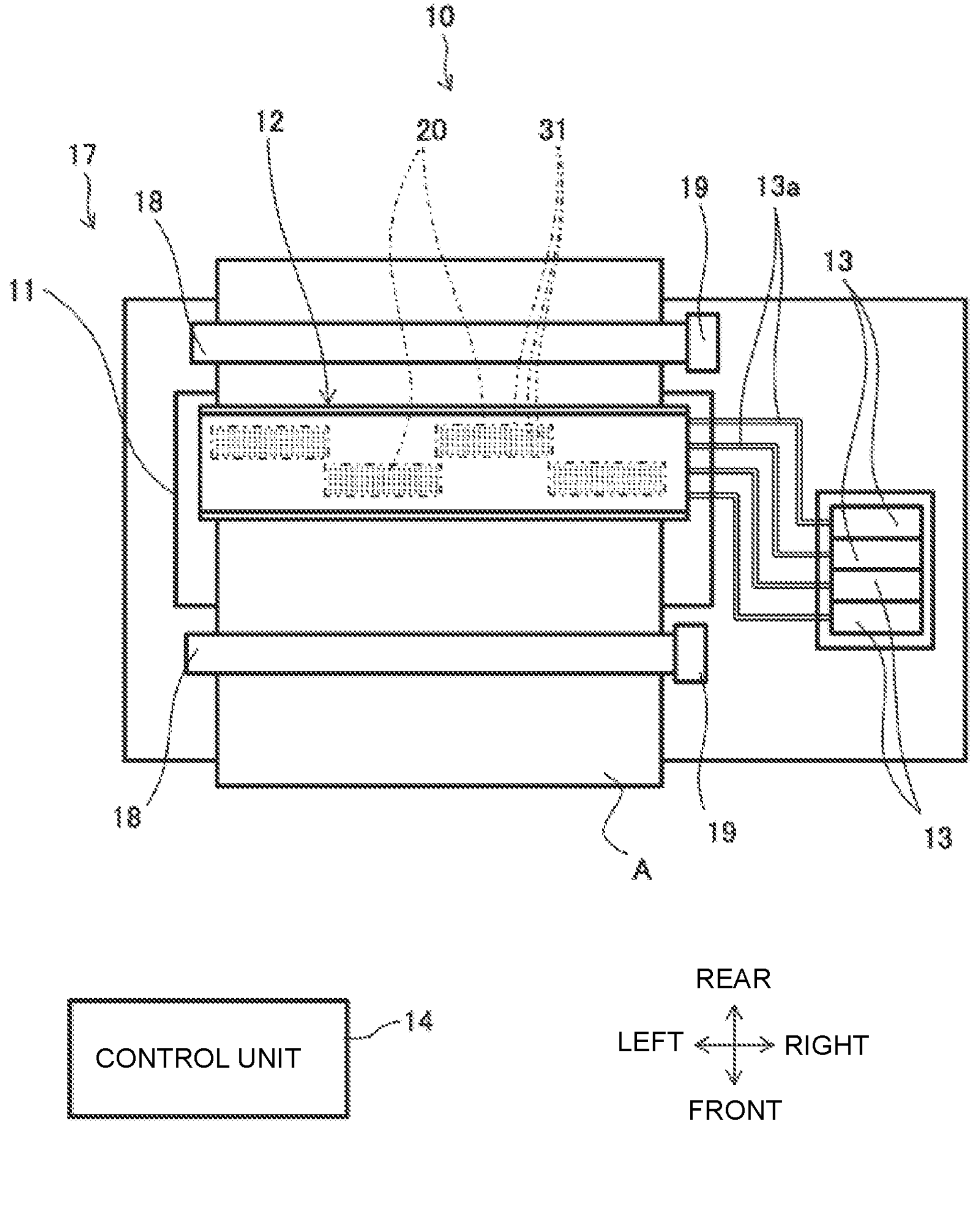
FIG. 1 is a diagram in which a liquid discharge apparatus according to an embodiment of the present teaching is viewed from above.

A liquid discharge apparatus 10 according to one embodiment of the present teaching is a device that discharges liquid such as ink, as depicted in FIG. 1. Although hereafter, there will be described an example of the liquid discharge apparatus 10 having been applied to an ink jet printer in which an image is formed by liquid being discharged onto a recorded medium A from a head 20, the liquid discharge apparatus 10 is not limited to this. Moreover, a sheet material of the likes of paper and cloth may be employed as the recorded medium A.

The liquid discharge apparatus 10, in which a line head system is adopted, comprises a platen 11, a head unit 12, a storage tank 13, a conveying device 17, and a control unit 14. Note that a designated first direction will be referred to as a front-rear direction, a second direction intersecting with (for example, orthogonal to) the first direction will be referred to as a left-right direction, and a third direction intersecting with (for example, orthogonal to) the first direction and the second direction will be referred to as an up-down direction. However, disposition of the liquid discharge apparatus 10 is not limited to this.

The platen 11, which is of a rectangular flat plate-like shape, for example, has a flat upper surface on which the recorded medium A is placed, and determines a distance between the recorded medium A and the head 20 in the up-down direction. The head 20, which extends longways in the left-right direction, has a length in the left-right direction not less than that of the recorded medium A. The head unit 12 is provided with one or a plurality of the heads 20. The head 20 is provided with a discharge surface 21 (FIG. 2) facing the upper surface of the platen 11, and a plurality of nozzles 31 that open onto the discharge surface 21. Note that details of the head 20 will be mentioned later.

The storage tank 13 is provided for each kind of liquid. For example, four storage tanks 13 have respectively stored therein black, yellow, cyan, and magenta liquids. The storage tanks 13 are corresponded to the plurality of nozzles 31 of the head 20, and supply liquid to the corresponding nozzles 31.

The conveying device 17 has a pair of conveying rollers 18 and conveying motors 19, for example. The pair of conveying rollers 18 are disposed sandwiching the platen 11 between each other in the front-rear direction with their axes extending in the left-right direction. The conveying roller 18, which is coupled to the conveying motor 19, rotates around its axis due to the conveying motor 19. As a result, the recorded medium A is conveyed in the front-rear direction on the platen 11.

The control unit 14, which is a computer, comprises an arithmetic circuit such as a CPU, and a memory of the likes of RAM and ROM. In the control unit 14, an arithmetic unit controls operation of the conveying motor 19 of the conveying device 17 and drive element 23 of the head 20, based on a program stored in a storage unit. For example, the control unit 14 executes a discharging operation causing liquid to be discharged onto the recorded medium A from the head 20 by the drive element 23, and a conveying operation causing the recorded medium A to be conveyed by the conveying device 17. As a result, there proceeds a print processing in which an image is formed on the recorded medium A by liquid, without the head 20 moving.

<Head>

Figure 2:
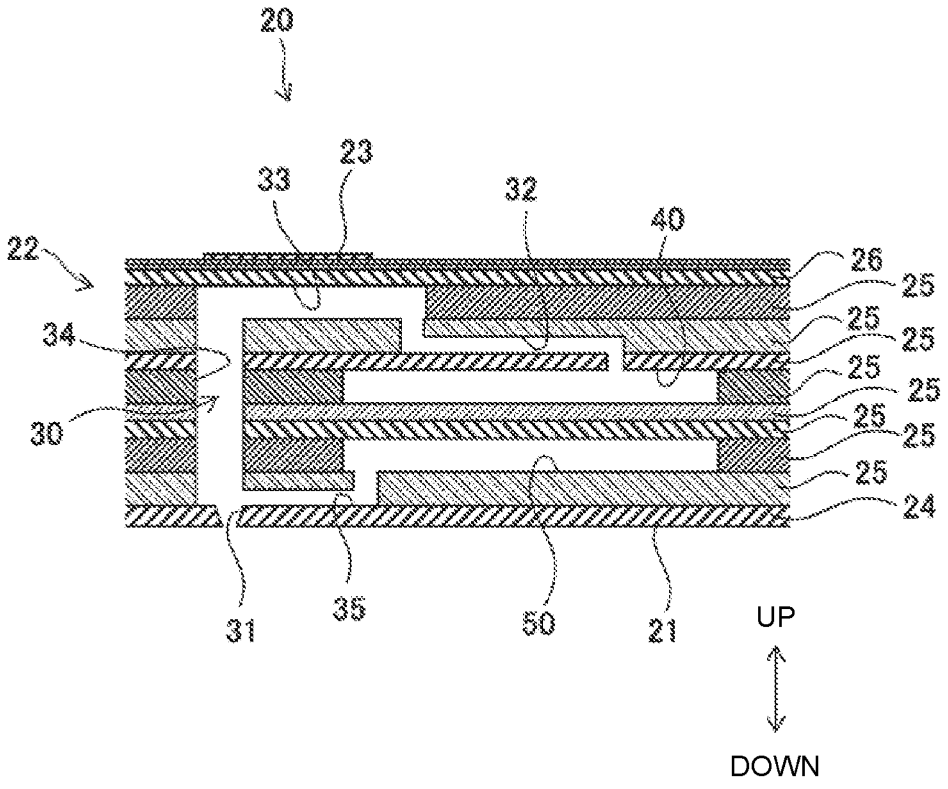
FIG. 2 is a cross-sectional view depicting part of a head.
Figure 3:
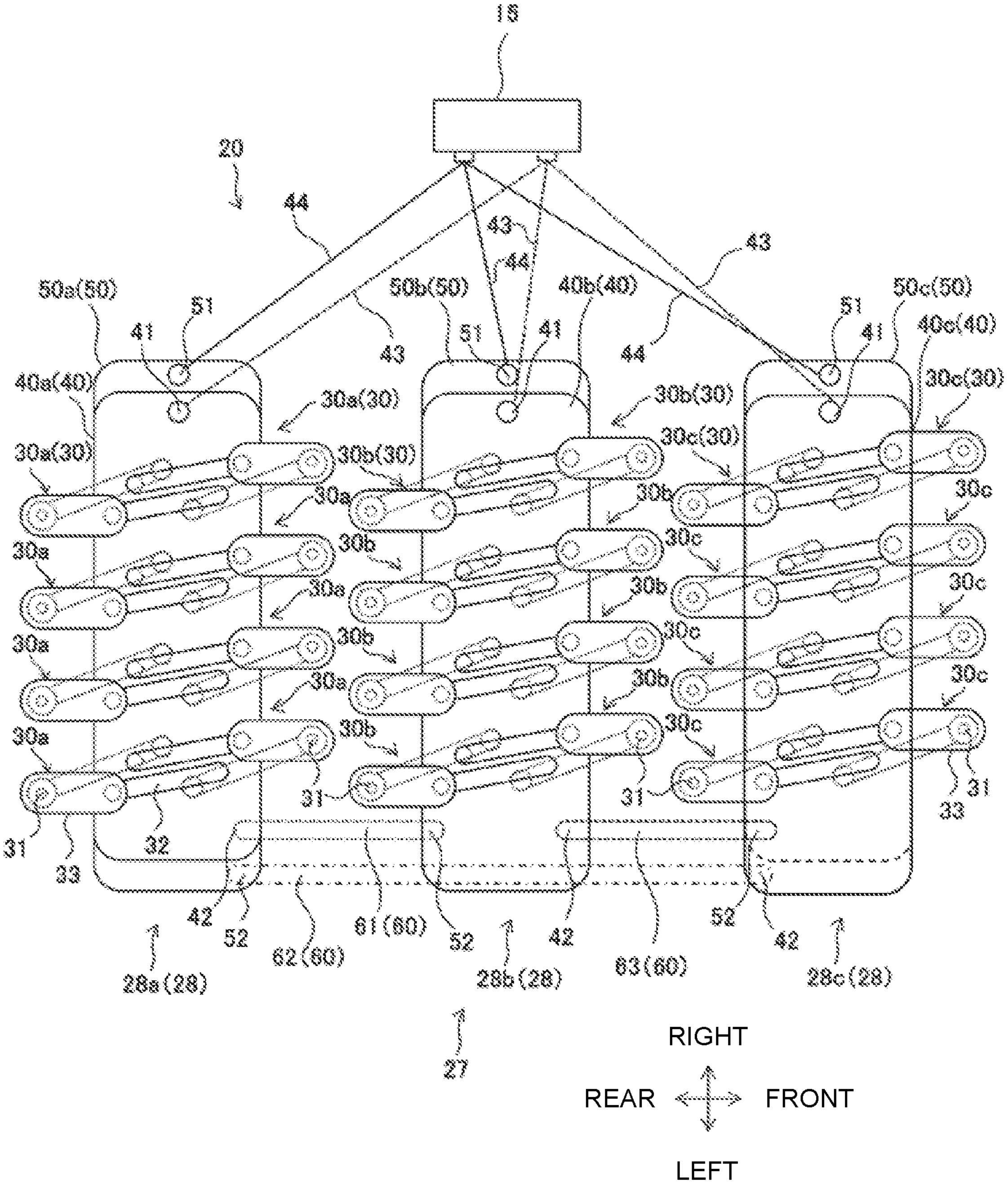
FIG. 3 is a diagram in which a channel unit in the head of FIG. 2 is viewed from above.

As depicted in FIGS. 2 and 3, the head 20 comprises a channel forming body 22 and the drive element 23, and is installed with a sub-tank 15. The channel forming body 22 is a laminated body having laminated therein a plurality of plates, and includes a nozzle plate 24, a plurality of (for example, eight) channel plates 25, and a vibrating plate 26, for example. These plates, which are of rectangular plate-like shape, are laminated in the up-down direction in this order, and are bonded to each other by an adhesive agent, or the like.

Each plate has formed therein a through-hole penetrating the plate, and a recess recessing from a lower surface or upper surface of the plate. For example, the plate comprises a resin or metal, and has its through-hole and recess formed by etching. Inside the channel forming body 22 where each of the plates are laminated, the through-holes and recesses are combined to form a channel unit 27, for example. The channel unit 27 includes a plurality of liquid channels 28 and a plurality of bypasses 60. The liquid channel 28 includes a plurality of individual channels 30, a supply manifold 40, and a return manifold 50. The bypass 60 connects the supply manifold 40 and the return manifold 50, and has liquid flowing therethrough. Note that details of the manifolds and bypasses 60 will be mentioned later.

As depicted in FIG. 2, the individual channel 30 includes the nozzle 31, a supply throttle 32, a pressure chamber 33, a descender 34, and a return throttle 35. The nozzle 31 penetrates the nozzle plate 24 in the up-down direction, and opens onto the discharge surface 21 being the lower surface of the nozzle plate 24. The supply throttle 32 is connected to the supply manifold 40 and pressure chamber 33. Cross-sectional area orthogonal to a flow-through direction that liquid flows in these is smaller in the supply throttle 32 than in the supply manifold 40 and the pressure chamber 33. The pressure chamber 33 has its upper end opening covered by the vibrating plate 26. The descender 34 is connected to the pressure chamber 33 and the nozzle 31. The return throttle 35 is connected to the descender 34 and return manifold 50, and cross-sectional area orthogonal to a flow-through direction that liquid flows is smaller in the return throttle 35 than in the descender 34 and the return manifold 50.

The drive element 23, which is an element applying a discharge pressure to liquid of the pressure chamber 33, is, for example, a piezoelectric element. The drive element 23 expands/contracts on receiving a control signal from the control unit 14 (FIG. 1). The vibrating plate 26 between the drive element 23 and the pressure chamber 33 deforms cooperatively with the drive element 23, and undergoes change in a direction that will increase/decrease volume of the pressure chamber 33. Hence, liquid of the pressure chamber 33 is applied with a discharge pressure discharging it from the nozzle 31, and liquid is discharged from the nozzle 31 communicating with the pressure chamber 33.

<Manifolds and Bypasses>

As depicted in FIG. 3, the supply manifold 40 and the return manifold 50, which extend longways in the left-right direction, are connected to a plurality of the individual channels 30. For example, the supply manifold 40 has a supply port 41 at its right end, and an outflow port 42 at its left end. The return manifold 50 has a return port 51 at its right end, and an inflow port 52 at its left end. The supply port 41 is connected to the sub-tank 15 by a supply pipe 43, and the return port 51 is connected to the sub-tank 15 by a return pipe 44. Moreover, the outflow port 42 and the inflow port 52 are connected by the bypass 60. The sub-tank 15 is connected by a tube 13*a* (FIG. 1) to the storage tank 13.

The plurality of liquid channels 28 include a first liquid channel 28*a*, a second liquid channel 28*b*, and a third liquid channel 28*c* that are arranged in the front-rear direction. The first liquid channel 28*a* includes a first supply manifold 40*a* being the supply manifold 40 and first return manifold 50*a* being the return manifold 50, and a plurality of first individual channels 30*a* being the individual channels 30 connected to these first supply manifold 40*a* and first return manifold 50*a*. The second liquid channel 28*b* includes a second supply manifold 40*b* being the supply manifold 40 and second return manifold 50*b* being the return manifold 50, and a plurality of second individual channels 30*b* being the individual channels 30 connected to these second supply manifold 40*b* and second return manifold 50*b*. The third liquid channel 28*c* includes a third supply manifold 40*c* being the supply manifold 40 and third return manifold 50*c* being the return manifold 50, and a plurality of third individual channels 30*c* being the individual channels 30 connected to these third supply manifold 40*c* and third return manifold 50*c*.

The first supply manifold 40*a*, the second supply manifold 40*b*, and the third supply manifold 40*c* are arranged in this order from the rear. The first return manifold 50*a*, the second return manifold 50*b*, and the third return manifold 50*c* are arranged in this order from the rear. The first supply manifold 40*a* is disposed above the first return manifold 50*a* so as to overlap the first return manifold 50*a* viewing along the up-down direction. The second supply manifold 40*b* is disposed above the second return manifold 50*b* so as to overlap the second return manifold 50*b* viewing along the up-down direction. The third supply manifold 40*c* is disposed above the third return manifold 50*c* so as to overlap the third return manifold 50*c* viewing along the up-down direction.

The bypass 60 includes a first bypass 61, a second bypass 62, and a third bypass 63. The first bypass 61 is connected to the outflow port 42 of the first supply manifold 40*a* and the inflow port 52 of the second return manifold 50*b*. The second bypass 62 is connected to the outflow port 42 of the third supply manifold 40*c* and the inflow port 52 of the first return manifold 50*a*. The third bypass 63 is connected to the outflow port 42 of the second supply manifold 40*b* and the inflow port 52 of the third return manifold 50*c*.

Figure 4:
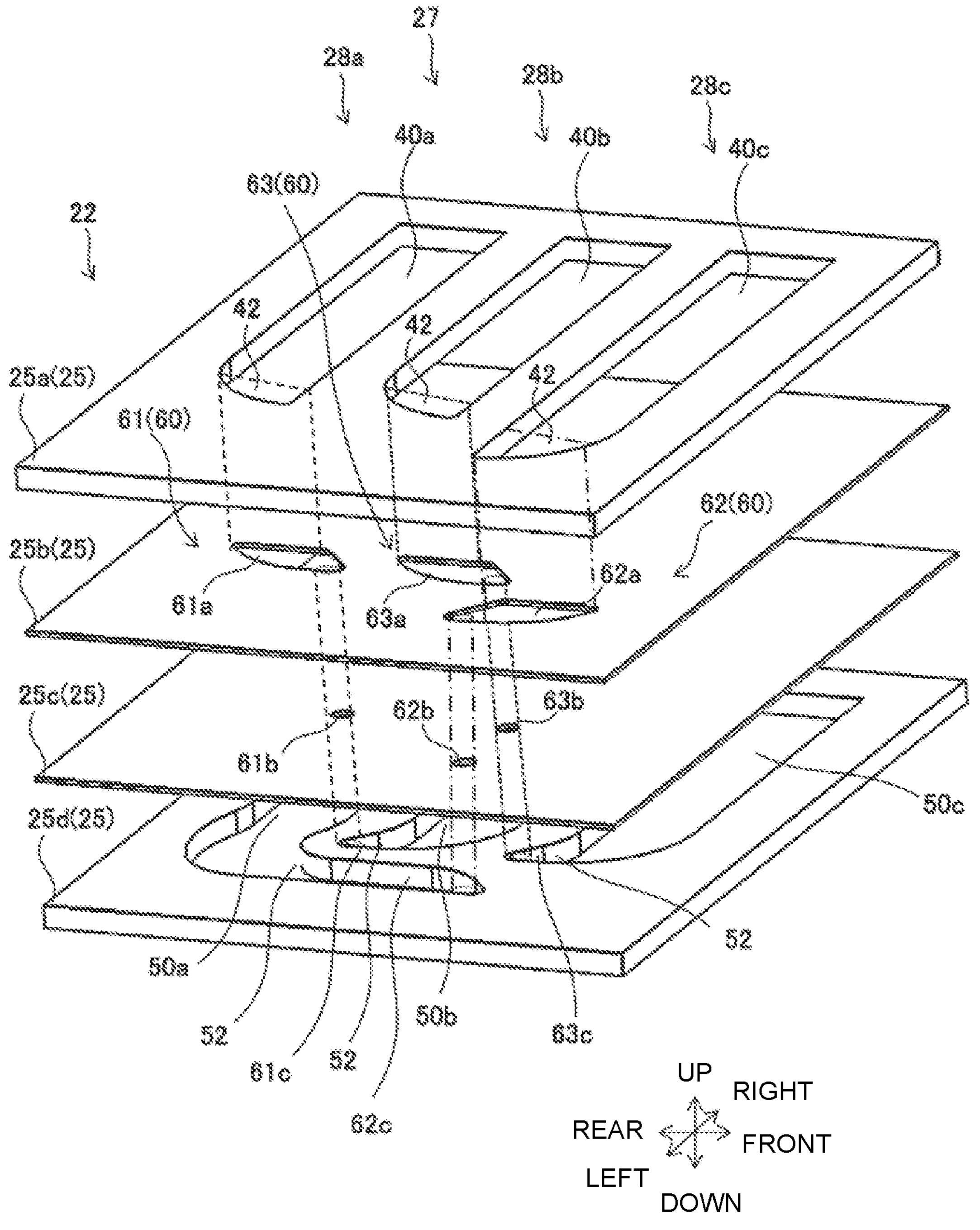
FIG. 4 is an exploded view of the channel unit of FIG. 2.

As depicted in FIG. 4, the plurality of channel plates 25 in the channel forming body 22 include a first channel plate 25*a*, a second channel plate 25*b*, a third channel plate 25*c*, and a fourth channel plate 25*d*. The first channel plate 25*a*, the second channel plate 25*b*, the third channel plate 25*c*, and the fourth channel plate 25*d* are laminated from above in this order. For example, in the up-down direction, dimensions of the first channel plate 25*a* and fourth channel plate 25*d* are larger than dimensions of the second channel plate 25*b* and third channel plate 25*c*. Note that in FIG. 4, the individual channel 30 is not illustrated.

The first supply manifold 40*a*, the second supply manifold 40*b*, and the third supply manifold 40*c* are formed as through-holes penetrating the first channel plate 25*a* in the up-down direction, and extend in the left-right direction. The first return manifold 50*a*, the second return manifold 50*b*, and the third return manifold 50*c* are formed as through-holes penetrating the fourth channel plate 25*d* in the up-down direction, and extend in the left-right direction.

The first bypass 61 includes a first upper portion 61*a*, a first middle portion 61*b*, and a first lower portion 61*c*, these being connected in this order. The first upper portion 61*a* penetrates the second channel plate 25*b* in the up-down direction. In the front-rear direction, a dimension of the first upper portion 61*a* is larger than a dimension of the first supply manifold 40*a*, and the first upper portion 61*a* extends further to the front than the first supply manifold 40*a*. The first upper portion 61*a* overlaps the first supply manifold 40*a* viewing along the up-down direction, and an upper end of the first upper portion 61*a* is connected to the outflow port 42 at a lower end of the first supply manifold 40*a*. The first middle portion 61*b* penetrates the third channel plate 25*c* in the up-down direction. The first lower portion 61*c* penetrates the fourth channel plate 25*d* in the up-down direction. In the front-rear direction, a dimension of the first lower portion 61*c* is larger than a dimension of the second return manifold 50*b*, and the first lower portion 61*c* extends further to the rear than the second return manifold 50*b*. In a portion where the first upper portion 61*a* and the first lower portion 61*c* overlap when viewed along the up-down direction, an upper end of the first middle portion 61*b* is connected to a lower end of the first upper portion 61*a*, and a lower end of the first middle portion 61*b* is connected to an upper end of the first lower portion 61*c*. A front end of the first lower portion 61*c* is connected to the inflow port 52 being a rear end of the second return manifold 50*b*.

The second bypass 62 includes a second upper portion 62*a*, a second middle portion 62*b*, and a second lower portion 62*c*, these being connected in this order. The second upper portion 62*a* penetrates the second channel plate 25*b* in the up-down direction. In the front-rear direction, a dimension of the second upper portion 62*a* is larger than a dimension of the third supply manifold 40*c*, and the second upper portion 62*a* extends further to the rear than the third supply manifold 40*c*. The second upper portion 62*a* overlaps the third supply manifold 40*c* viewing along the up-down direction, and an upper end of the second upper portion 62*a* is connected to the outflow port 42 at a lower end of the third supply manifold 40*c*. The second middle portion 62*b* penetrates the third channel plate 25*c* in the up-down direction. The second lower portion 62*c* penetrates the fourth channel plate 25*d* in the up-down direction. In the front-rear direction, a dimension of the second lower portion 62*c* is larger than a dimension of the first return manifold 50*a*, and the second lower portion 62*c* extends further to the front than the first return manifold 50*a*. In a portion where the second upper portion 62*a* and the second lower portion 62*c* overlap when viewed along the up-down direction, an upper end of the second middle portion 62*b* is connected to a lower end of the second upper portion 62*a*, and a lower end of the second middle portion 62*b* is connected to an upper end of the second lower portion 62*c*. A rear end of the second lower portion 62*c* is connected to the inflow port 52 being a front end of the first return manifold 50*a*.

The third bypass 63 includes a third upper portion 63*a*, a third middle portion 63*b*, and a third lower portion 63*c*, these being connected in this order. The third upper portion 63*a* penetrates the second channel plate 25*b* in the up-down direction. In the front-rear direction, a dimension of the third upper portion 63*a* is larger than a dimension of the second supply manifold 40*b*, and the third upper portion 63*a* extends further to the front than the second supply manifold 40*b*. The third upper portion 63*a* overlaps the second supply manifold 40*b* viewing along the up-down direction, and an upper end of the third upper portion 63*a* is connected to the outflow port 42 at a lower end of the second supply manifold 40*b*. The third middle portion 63*b* penetrates the third channel plate 25*c* in the up-down direction. The third lower portion 63*c* penetrates the fourth channel plate 25*d* in the up-down direction. In the front-rear direction, a dimension of the third lower portion 63*c* is larger than a dimension of the third return manifold 50*c*, and the third lower portion 63*c* extends further to the rear than the third return manifold 50*c*. In a portion where the third upper portion 63*a* and the third lower portion 63*c* overlap when viewed along the up-down direction, an upper end of the third middle portion 63*b* is connected to a lower end of the third upper portion 63*a*, and a lower end of the third middle portion 63*b* is connected to an upper end of the third lower portion 63*c*. A front end of the third lower portion 63*c* is connected to the inflow port 52 being a rear end of the third return manifold 50*c*.

Figure 5:
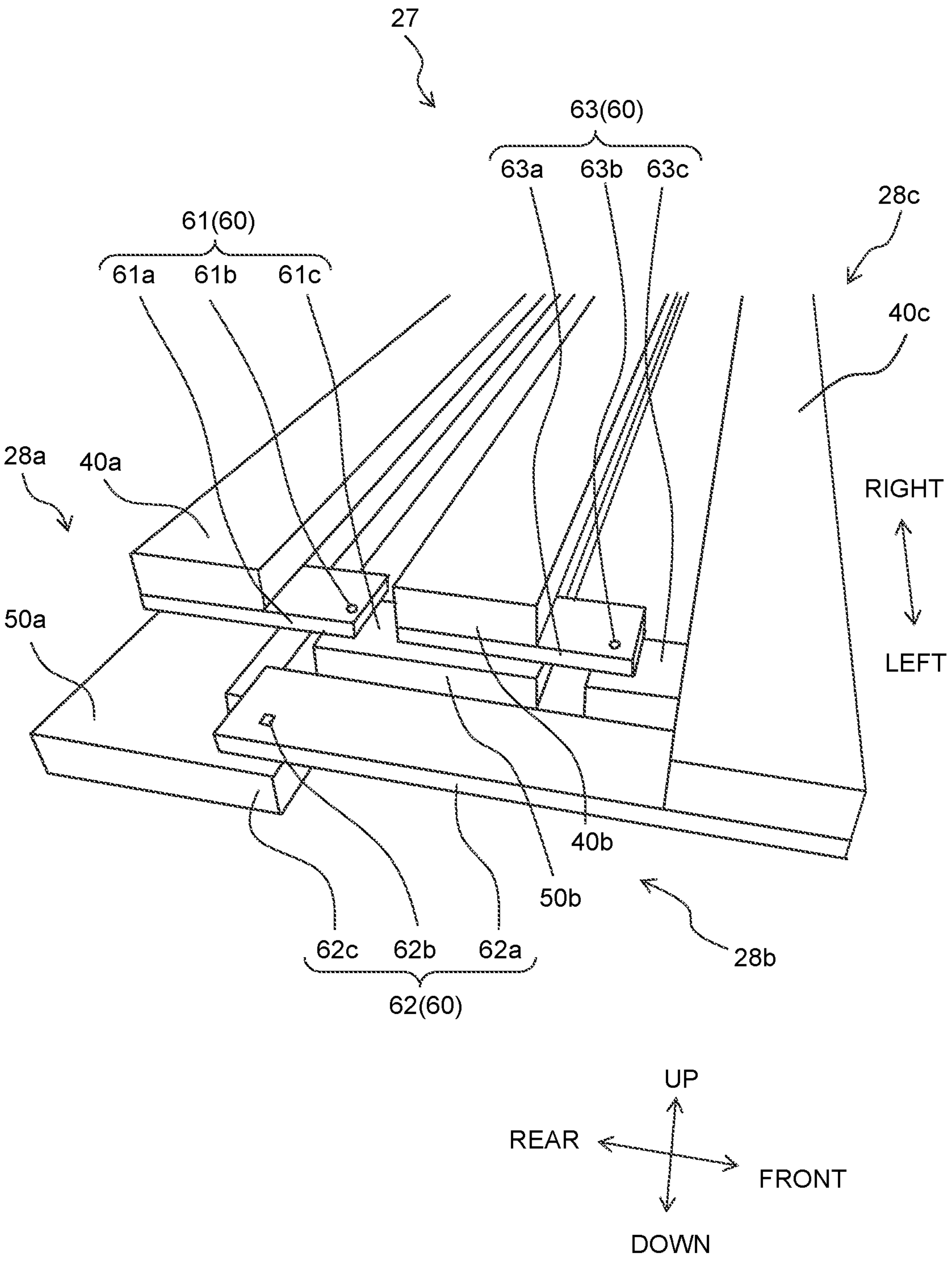
FIG. 5 is a perspective view of the channel unit of FIG. 2.

As depicted in FIG. 5, the first supply manifold 40*a* included in the first liquid channel 28*a* is connected via the first bypass 61 included in the bypass 60, only to the second return manifold 50*b* included in the second liquid channel 28*b*. The first return manifold 50*a* included in the first liquid channel 28*a* is connected via the second bypass 62 included in the bypass 60, only to the third supply manifold 40*c* included in the third liquid channel 28*c*. The second supply manifold 40*b* included in the second liquid channel 28*b* is connected via the third bypass 63 included in the bypass 60, only to the third return manifold 50*c* included in the third liquid channel 28*c*. Note that in FIG. 5, the individual channel 30 is not illustrated.

<Flow of Liquid>

Liquid is supplied to the sub-tank 15 from the storage tank 13, passes along the supply pipe 43 from the sub-tank 15, and flows into the first supply manifold 40*a* via the supply port 41. Then, the liquid flows to the left along the first supply manifold 40*a*, and, while doing so, is supplied to each of the plurality of first individual channels 30*a* connected to the first supply manifold 40*a*. In the first individual channel 30*a*, the liquid flows through the supply throttle 32, the pressure chamber 33, and the descender 34, and is supplied to the nozzle 31. Now, the liquid is discharged from the nozzle 31 upon being applied with a pressure by the drive element 23. On the other hand, liquid that has not been discharged from the nozzle 31 passes through the return throttle 35 and flows into the first return manifold 50*a*. The liquid flows to the right along the first return manifold 50*a*, passes along the return pipe 44 from the return port 51 of the first return manifold 50*a*, and returns to the sub-tank 15. Thus, as a nozzle circulation, the liquid circulates from the sub-tank 15, through the first supply manifold 40*a*, first individual channels 30*a*, and first return manifold 50*a*, back to the sub-tank 15.

Moreover, liquid that has not flowed into the first individual channels 30*a* from the first supply manifold 40*a* while flowing to the left along the first supply manifold 40*a* passes through the first bypass 61 from the outflow port 42 of the first supply manifold 40*a*, and flows via the inflow port 52 into the second return manifold 50*b*. The liquid flows to the right along the second return manifold 50*b*, passes through the return pipe 44 from the return port 51 of the second return manifold 50*b*, and returns to the sub-tank 15. Thus, as a manifold circulation, the liquid circulates from the sub-tank 15, through the first supply manifold 40*a*, first bypass 61, and second return manifold 50*b*, back to the sub-tank 15.

Similarly to in the first supply manifold 40*a*, liquid flows into the second supply manifold 40*b* from the sub-tank 15, and, while flowing along the second supply manifold 40*b*, is supplied to each of the plurality of second individual channels 30*b*. In the second individual channel 30*b*, the liquid is discharged from the nozzle 31 upon being applied with a pressure by the drive element 23. On the other hand, liquid that has not been discharged from the nozzle 31 passes along the second return manifold 50*b* from the second individual channels 30*b*, and returns to the sub-tank 15. Thus, as a nozzle circulation, the liquid circulates from the sub-tank 15, through the second supply manifold 40*b*, second individual channels 30*b*, and second return manifold 50*b*, back to the sub-tank 15.

Moreover, liquid that has not flowed into the second individual channels 30*b* from the second supply manifold 40*b* passes through the third bypass 63 from the second supply manifold 40*b*, flows into the third return manifold 50*c*, and returns to the sub-tank 15 from the third return manifold 50*c*. Thus, as a manifold circulation, the liquid circulates from the sub-tank 15, through the second supply manifold 40*b*, third bypass 63, and third return manifold 50*c*, back to the sub-tank 15.

Similarly to in the first supply manifold 40*a*, liquid flows into the third supply manifold 40*c* from the sub-tank 15, and, while flowing along the third supply manifold 40*c*, is supplied to each of the plurality of third individual channels 30*c*. In the third individual channel 30*c*, the liquid is discharged from the nozzle 31 upon being applied with a pressure by the drive element 23. On the other hand, liquid that has not been discharged from the nozzle 31 passes along the third return manifold 50*c* from the third individual channels 30*c*, and returns to the sub-tank 15. Thus, as a nozzle circulation, the liquid circulates from the sub-tank 15, through the third supply manifold 40*c*, third individual channels 30*c*, and third return manifold 50*c*, back to the sub-tank 15.

Moreover, liquid that has not flowed into the third individual channels 30*c* from the third supply manifold 40*c* passes through the second bypass 62 from the third supply manifold 40*c*, flows into the first return manifold 50*a*, and returns to the sub-tank 15 from the first return manifold 50*a*. Thus, as a manifold circulation, the liquid circulates from the sub-tank 15, through the third supply manifold 40*c*, second bypass 62, and first return manifold 50*a*, back to the sub-tank 15.

Thus, the first supply manifold 40*a* and the first return manifold 50*a* of the first liquid channel 28*a* are connected by bypasses 60 to liquid channels 28 that differ from each other. The second supply manifold 40*b* and the second return manifold 50*b* of the second liquid channel 28*b* are connected by bypasses 60 to liquid channels 28 that differ from each other. The third supply manifold 40*c* and the third return manifold 50*c* of the third liquid channel 28*c* are connected by bypasses 60 to liquid channels 28 that differ from each other. Moreover, the first supply manifold 40*a* is connected by the first bypass 61 one-on-one to the second return manifold 50*b*, the second supply manifold 40*b* is connected by the third bypass 63 one-on-one to the third return manifold 50*c*, and the third supply manifold 40*c* is connected by the second bypass 62 one-on-one to the first return manifold 50*a*. Hence, uniformity of flow rates of liquid in the manifolds 40, 50 can be achieved, while crosstalk is reduced.

<First Modification>

In a liquid discharge apparatus 10 according to a first modification, in the above-described embodiment, cross-sectional area through which liquid passes, of the second bypass 62 is larger than in the first bypass 61 and the third bypass 63. For example, cross-sectional area of the second bypass 62 is area orthogonal to a flow-through direction that liquid flows to the first return manifold 50*a* from the third supply manifold 40*c*. Cross-sectional area of the first bypass 61 is area orthogonal to a flow-through direction that liquid flows to the second return manifold 50*b* from the first supply manifold 40*a*. Cross-sectional area of the third bypass 63 is area orthogonal to a flow-through direction that liquid flows to the third return manifold 50*c* from the second supply manifold 40*b*.

In the example of FIGS. 4 and 5, cross-sectional area of the bypass 60 differs in its upper portion, middle portion, and lower portion. In such a case, fellow corresponding portions in the first bypass 61, the second bypass 62, and the third bypass 63 may be compared. In this case, cross-sectional area of the second upper portion 62*a* is larger than cross-sectional area of the first upper portion 61*a* and cross-sectional area of the third upper portion 63*a*. Cross-sectional area of the second middle portion 62*b* is larger than cross-sectional area of the first middle portion 61*b* and cross-sectional area of the third middle portion 63*b*. Cross-sectional area of the second lower portion 62*c* is larger than cross-sectional area of the first lower portion 61*c* and cross-sectional area of the third lower portion 63*c*. Now, for example, cross-sectional area of the upper portions 61*a*, 62*a*, 63*a* is cross-sectional area orthogonal to the front-rear direction, cross-sectional area of the middle portions 61*b*, 62*b*, 63*b* is cross-sectional area orthogonal to the up-down direction, and cross-sectional area of the lower portions 61*c*, 62*c*, 63*c* is cross-sectional area orthogonal to the front-rear direction.

If length along a flow-through direction in the second bypass 62 is longer than in the first bypass 61 and the third bypass 63, then channel resistance in the second bypass 62 will become larger than in the first bypass 61 and the third bypass 63. In contrast, cross-sectional area with respect to a direction that liquid flows through the second bypass 62 is larger than in the first bypass 61 and the third bypass 63. As a result, channel resistance in the second bypass 62 will become smaller than in the first bypass 61 and the third bypass 63. Hence, in the first bypass 61, the second bypass 62, and the third bypass 63, channel resistances can be made equal to each other or have their differences with each other reduced to no more than a designated value, and flowrates can be made uniform with each other. For example, in the case of a viscosity region of liquid such as ink being not less than 2 (mPa·s) and not more than 10 (mPa·s), channel resistance of the bypass 60 will be about not less than 200 (kPa/(cc/s)) and not more than 2000 (kPa/(cc/s)).

Note that the bypass 60 may have each of cross-sectional areas of its upper portion, middle portion, and lower portion equal to each other, and may have said cross-sectional areas fixed. Moreover, regarding at least one portion from among the upper portion, the middle portion, and the lower portion, cross-sectional area may be larger in the second bypass 62 than in the first bypass 61 and the third bypass 63, whereas for the other portions, cross-sectional area in the second bypass 62 may be the same as in the first bypass 61 and the third bypass 63.

<Second Modification>

In a liquid discharge apparatus 10 according to a second modification, in the above-described embodiment and first modification, the supply manifold 40 and return manifold 50 extend in the left-right direction. A dimension in the up-down direction of the second bypass 62 is larger than in the first bypass 61 and the third bypass 63.

Figure 6A:
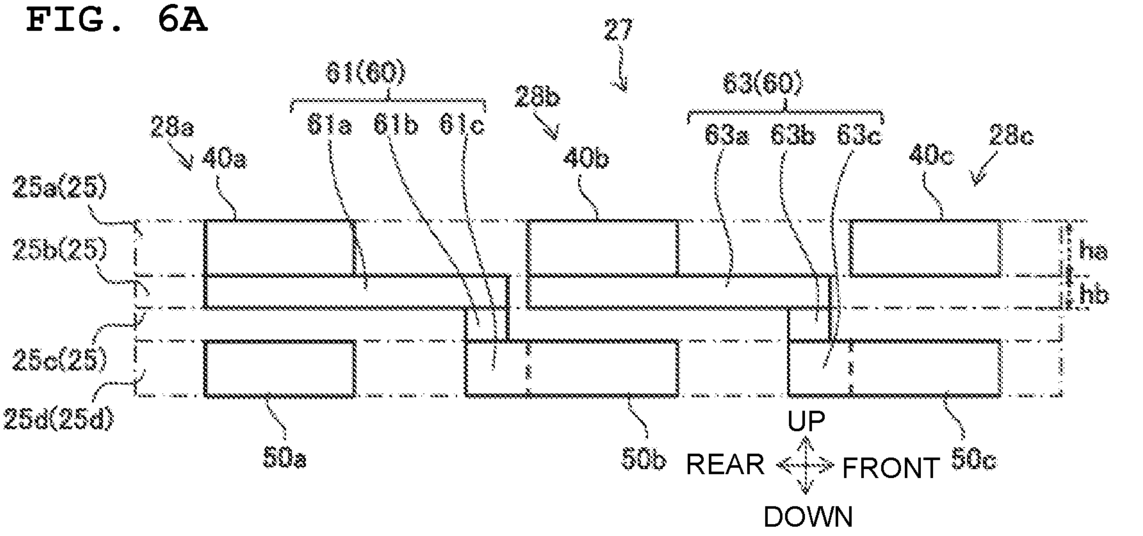
FIGS. 6A to 6C are diagrams in which a liquid discharge apparatus according to a second modification of the present teaching is viewed from the left.
Figure 6B:
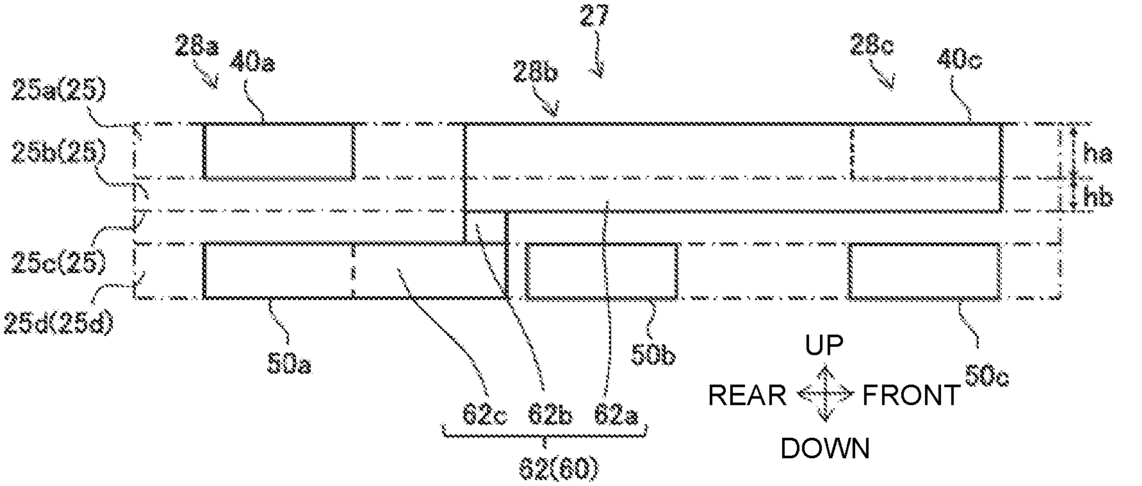

For example, as depicted in FIG. 6A, the first upper portion 61*a* of the first bypass 61 and third upper portion 63*a* of the third bypass 63 are formed in the second channel plate 25*b*. In contrast, as depicted in FIG. 6B, the second upper portion 62*a* of the second bypass 62 is formed in the first channel plate 25*a* and the second channel plate 25*b*. Therefore, in the up-down direction, dimensions of the first upper portion 61*a* and third upper portion 63*a* are equal to a dimension hb of the second channel plate 25*b*, whereas a dimension of the second upper portion 62*a* is equal to the sum of a dimension ha of the first channel plate 25*a* and the dimension hb of the second channel plate 25*b*. Hence, the dimension of the second upper portion 62*a* is larger than the dimensions of the first upper portion 61*a* and third upper portion 63*a*.

Figure 6C:
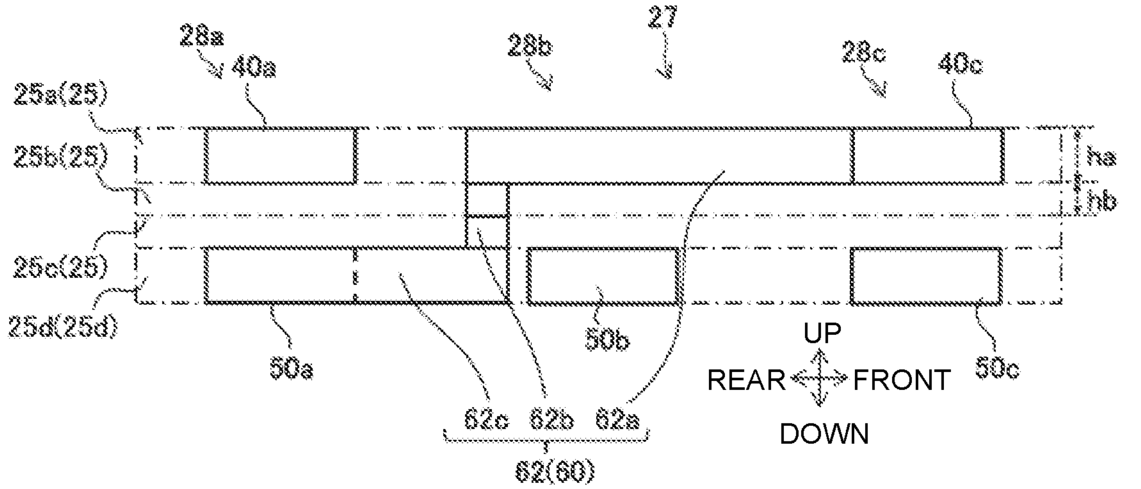

Moreover, as a separate example, as depicted in FIG. 6C, the second upper portion 62*a* of the second bypass 62 is formed in the first channel plate 25*a*, and its second middle portion 62*b* is formed in the second channel plate 25*b* and third channel plate 25*c*. In this case, in the up-down direction, the dimensions of the first upper portion 61*a* and third upper portion 63*a* are equal to the dimension hb of the second channel plate 25*b*, and the dimension of the second upper portion 62*a* is equal to the dimension ha of the first channel plate 25*a*. Now, the dimension ha of the first channel plate 25*a* is larger than the dimension hb of the second channel plate 25*b*. Therefore, in the up-down direction, the dimension of the second upper portion 62*a* is larger than the dimensions of the first upper portion 61*a* and third upper portion 63*a*.

In a cross-section of the upper portion orthogonal to the front-rear direction, a dimension in the up-down direction is smaller than a dimension in the left-right direction, for example. In this case, flow-through resistance of liquid along the front-rear direction can be kept smaller by increasing the dimension in the up-down direction than by increasing the dimension in the left-right direction. Hence, in the up-down direction, the dimension of the second upper portion 62*a* is made larger than the dimensions of the first upper portion 61*a* and third upper portion 63*a*. As a result, even if length along a flow-through direction of liquid is longer in the second bypass 62 than in the first bypass 61 and third bypass 63, channel resistance of the second bypass 62 can be kept small, and uniformity of flowrate in the first bypass 61, second bypass 62, and third bypass 63 can be achieved.

Note that as in the above-described examples of FIGS. 6B and 6C, the dimension in the up-down direction has been made larger in the second bypass 62 than in the first bypass 61 and third bypass 63, for one portion from among the upper portion, middle portion, and lower portion. However, dimensions of the whole of the second bypass 62 may be made larger than in the first bypass 61 and third bypass 63.

<Third Modification>

In a liquid discharge apparatus 10 according to a third modification, in the above-described embodiment and the first and second modifications, the supply manifold 40 and return manifold 50 extend in the left-right direction. The first individual channel 30*a* included in the first liquid channel 28*a* is located further to one side in the left-right direction than the first bypass 61. The second individual channel 30*b* included in the second liquid channel 28*b* is located further to one side in the left-right direction than the third bypass 63. The second bypass 62 is located further to the other side in the left-right direction than both the first bypass 61 and the third bypass 63.

In the example of FIG. 3, the first individual channel 30*a*, second individual channel 30*b*, and third individual channel 30*c* are disposed further to the right than the first bypass 61 and third bypass 63, in the left-right direction. The second bypass 62 is disposed further to the left than the first bypass 61 and third bypass 63, in the left-right direction. As a result, as depicted in FIG. 4, the first upper portion 61*a*, second upper portion 62*a*, and third upper portion 63*a* are formed in the same second channel plate 25*b* as each other. Therefore, increase in size of the head 20 in the up-down direction and increase in the number of components can be suppressed.

<Fourth Modification>

In a liquid discharge apparatus 10 according to a fourth modification, in the above-described embodiment and the first and second modifications, the supply manifold 40 and return manifold 50 extend in the left-right direction. The first individual channel 30*a* included in the first liquid channel 28*a* is located further to one side in the left-right direction than the first bypass 61. The second individual channel 30*b* included in the second liquid channel 28*b* is located further to one side in the left-right direction than the third bypass 63. The second bypass 62 is located between the first individual channel 30*a* included in the first liquid channel 28*a* and first bypass 61 and between the second individual channel 30*b* included in the second liquid channel 28*b* and third bypass 63, in the left-right direction.

Figure 7:
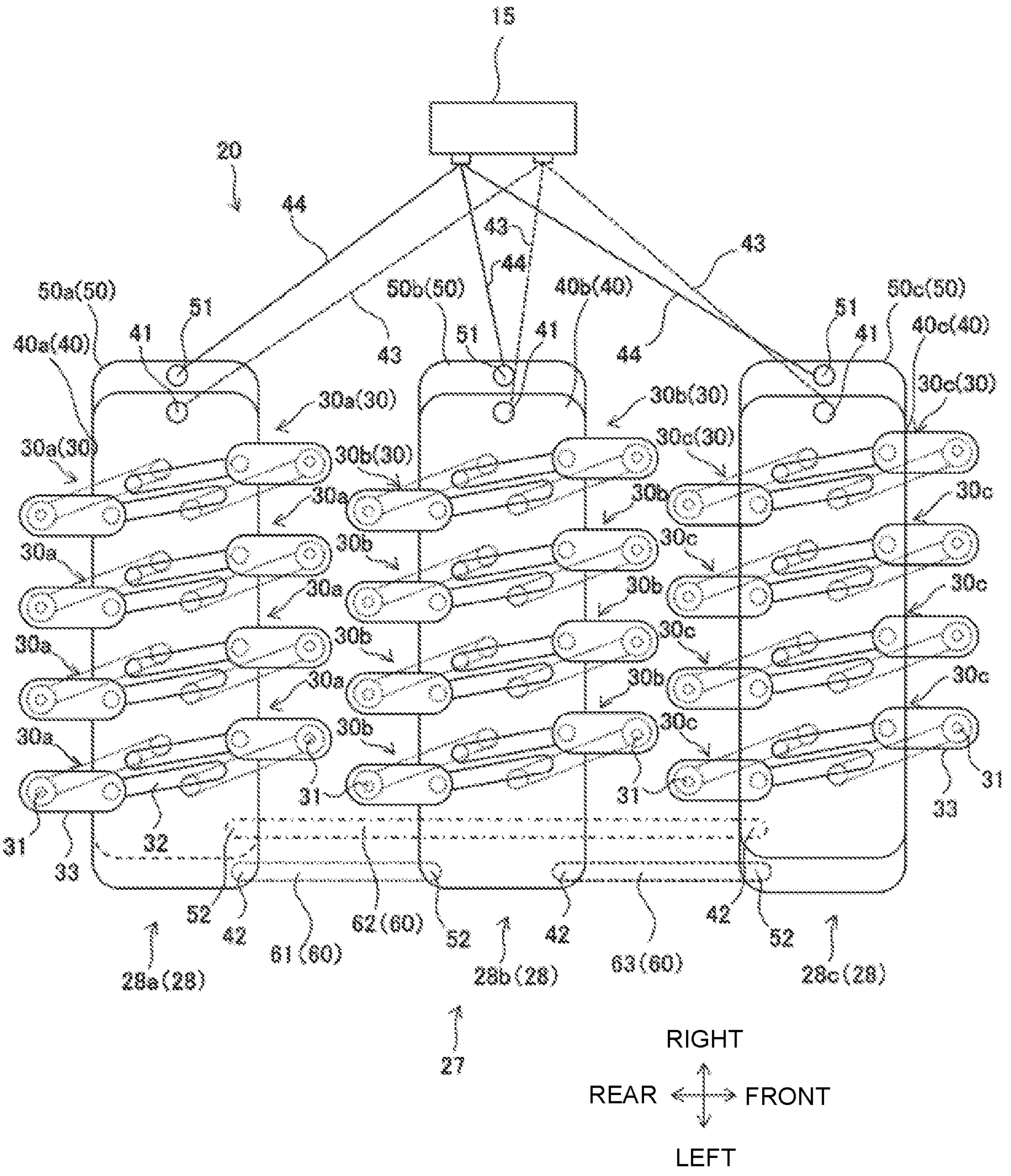
FIG. 7 is a diagram in which a channel unit of a liquid discharge apparatus according to a fourth modification of the present teaching is viewed from above.
Figure 8:
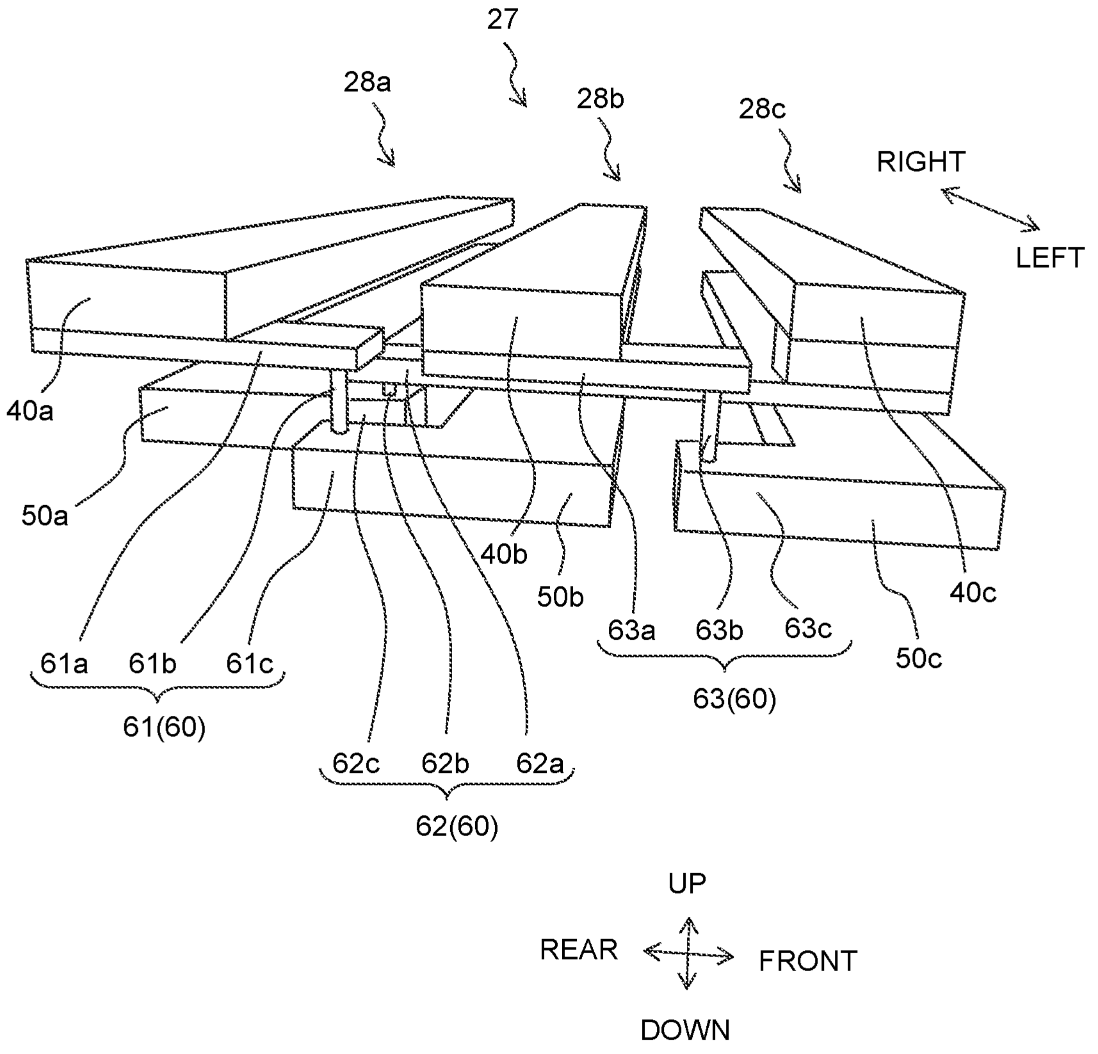
FIG. 8 is a perspective view of the channel unit of FIG. 7.

In the example of FIGS. 7 and 8, the first individual channel 30*a*, second individual channel 30*b*, and third individual channel 30*c* are disposed further to the right than the second bypass 62, in the left-right direction. The first bypass 61 and third bypass 63 are disposed further to the left than the second bypass 62, in the left-right direction. As a result, dimensions in the left-right direction of the third supply manifold 40*c* and first return manifold 50*a* connected to the second bypass 62 are shorter than in the first supply manifold 40*a* and second return manifold 50*b* connected to the first bypass 61 and in the second supply manifold 40*b* and third return manifold 50*c* connected to the third bypass 63. As a result, even if the second bypass 62 is longer than the first bypass 61 and third bypass 63, the third supply manifold 40*c* and first return manifold 50*a* will be shorter than the other manifolds. Hence, uniformity of flowrate in the supply manifolds 40 and return manifolds 50 can be achieved.

<Fifth Modification>

A liquid discharge apparatus 10 according to a fifth modification, in the above-described embodiment and the first to fourth modifications, comprises the drive element 23 that applies to liquid of the individual channel 30 a discharge pressure discharging the liquid from the nozzle 31. The supply manifold 40 and return manifold 50 extend in the left-right direction. The drive element 23, the supply manifold 40, and the return manifold 50 are disposed in this order in the up-down direction. The bypass 60 is disposed in the same position as the supply manifold 40 in the up-down direction, or in a position closer to the supply manifold 40 than to the return manifold 50 in the up-down direction.

Figure 9:
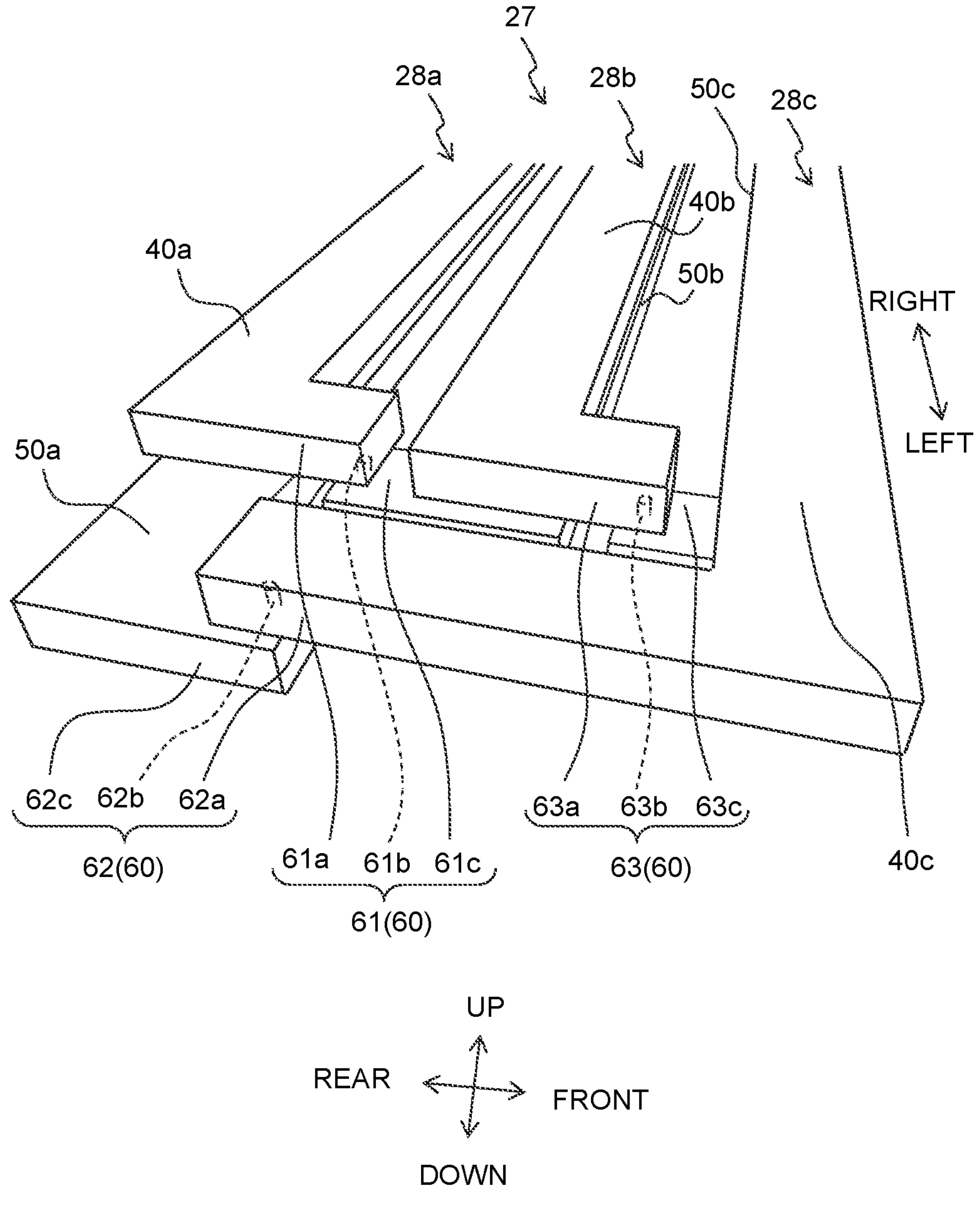
FIG. 9 is a perspective view of a channel unit of a liquid discharge apparatus according to a fifth modification of the present teaching.
Figure 10A:
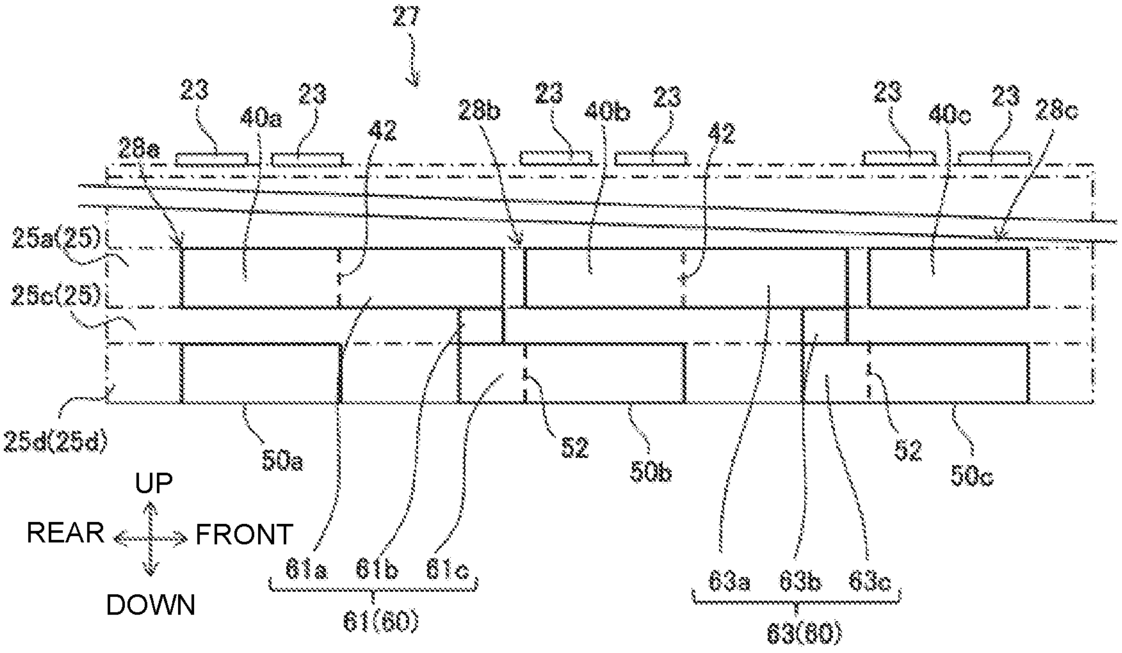
FIGS. 10A and 10B are diagrams in which the channel unit of FIG. 9 is viewed from the left.
Figure 10B:
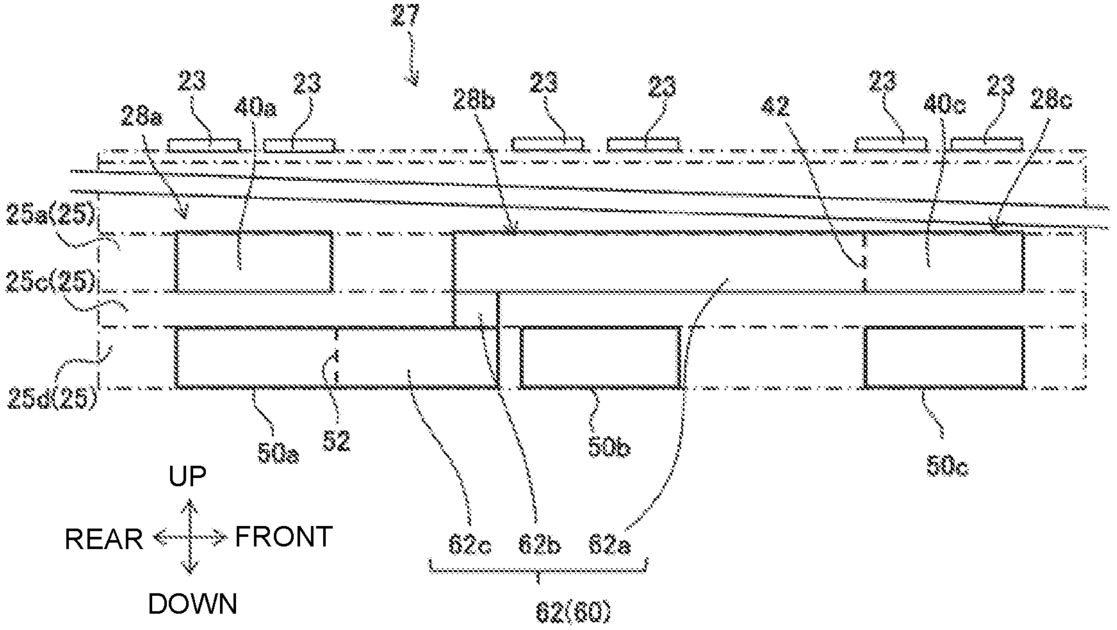

Specifically, in the example of FIGS. 4 and 5, the upper portions 61*a*, 62*a*, 63*a* were formed in the second channel plate 25*b*. In contrast, in the example of FIGS. 9, 10A and 10B, the upper portions 61*a*, 62*a*, 63*a* are each formed in the first channel plate 25*a*. In this case, the channel forming body 22 does not include the second channel plate 25*b*. However, the upper portions 61*a*, 62*a*, 63*a* may be formed in the first channel plate 25*a* and the second channel plate 25*b*. Alternatively, the middle portions 61*b*, 62*b*, 63*b* may be formed in the second channel plate 25*b* and the third channel plate 25*c*. In this case, the channel forming body 22 does include the second channel plate 25*b*.

The first upper portion 61*a* of the first bypass 61, which penetrates the first channel plate 25*a* in the up-down direction, extends frontwards from the first supply manifold 40*a*. A rear end of the first upper portion 61*a* is connected to the outflow port 42 at the front end of the first supply manifold 40*a*. The second upper portion 62*a* of the second bypass 62, which penetrates the first channel plate 25*a* in the up-down direction, extends rearwards from the third supply manifold 40*c*. A front end of the second upper portion 62*a* is connected to the outflow port 42 at the rear end of the third supply manifold 40*c*. The third upper portion 63*a* of the third bypass 63, which penetrates the first channel plate 25*a* in the up-down direction, extends frontwards from the second supply manifold 40*b*. A rear end of the third upper portion 63*a* is connected to the outflow port 42 at the front end of the second supply manifold 40*b*.

In this way, the bypass 60 is disposed in the same position as the supply manifold 40 in the up-down direction, or in a position closer to the supply manifold 40 than to the return manifold 50 in the up-down direction. The drive element 23 is closer to the supply manifold 40 than to the return manifold 50 in the up-down direction. Therefore, the bypass 60 is close to the drive element 23, the drive element 23 can be cooled by liquid flowing along the bypass 60, and thermal degradation of the drive element 23 can be reduced.

Note that in the case described above, the first bypass 61, second bypass 62, and third bypass 63 are all formed in the first channel plate 25*a*. However, at least one bypass 60 of the first bypass 61, second bypass 62, and third bypass 63 may be formed in the first channel plate 25*a*, and the other bypasses 60 formed in the second channel plate 25*b*. Moreover, in the case described above, the bypass 60 was disposed in the same position in the up-down direction as the supply manifold 40. However, the bypass 60 may be disposed in a position closer to the supply manifold 40 than a midway point between the supply manifold 40 and return manifold 50, in the up-down direction.

<Sixth Modification>

Figure 11:
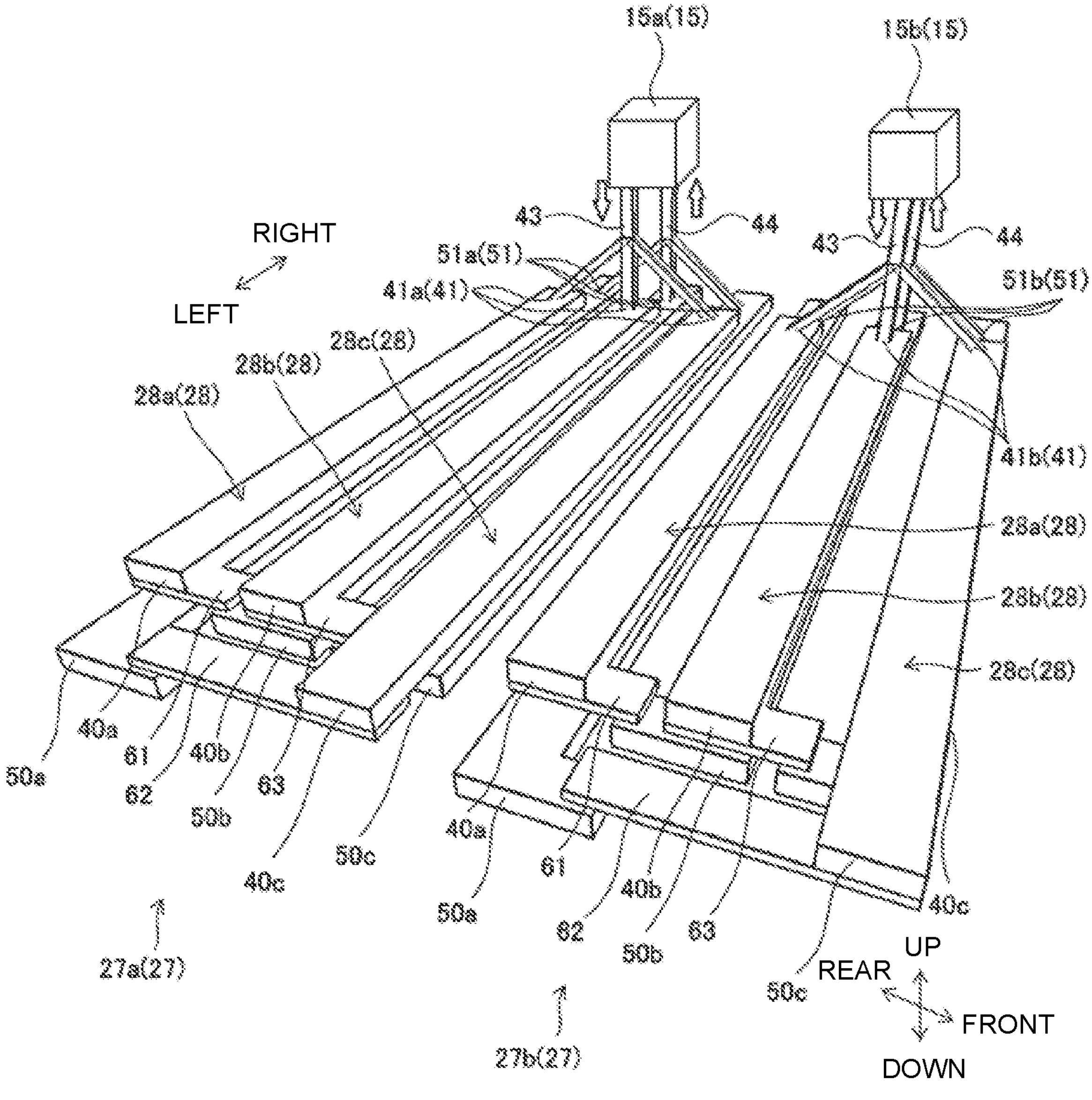
FIG. 11 is a perspective view of a channel unit of a liquid discharge apparatus according to a sixth modification of the present teaching.

A liquid discharge apparatus 10 according to a sixth modification, in the above-described embodiment and the first to fifth modifications, comprises a plurality of pairs of the channel units 27 configured including a plurality of the liquid channels 28 and the bypasses 60, as depicted in FIG. 11. The supply manifold 40 included in one pair of the channel units 27 is provided with a first supply port 41*a* supplied with liquid from a first tank 15*a*, and the supply manifold 40 included in another pair of the channel units 27 is provided with a second supply port 41*b* supplied with liquid from a second tank 15*b*. Now, the bypasses 60 included in the plurality of channel units 27 may have the same layout as each other. Note that in FIG. 11, the individual channel 30 is not illustrated.

In the example of FIG. 11, the channel unit 27 includes a first channel unit 27*a* and a second channel unit 27*b* that differs from the first channel unit 27*a*. Each of the channel units 27, that is, the first channel unit 27*a* and the second channel unit 27*b* includes a plurality of the liquid channels 28 and a plurality of the bypasses 60. The plurality of liquid channels 28 include the first liquid channel 28*a*, the second liquid channel 28*b*, and the third liquid channel 28*c*. The first liquid channel 28*a* includes the first supply manifold 40*a* and the first return manifold 50*a*. The second liquid channel 28*b* includes the second supply manifold 40*b* and the second return manifold 50*b*. The third liquid channel 28*c* includes the third supply manifold 40*c* and the third return manifold 50*c*.

The first supply port 41*a* of the first channel unit 27*a* includes the supply port 41 of the first supply manifold 40*a*, supply port 41 of the second supply manifold 40*b*, and supply port 41 of the third supply manifold 40*c* in the first channel unit 27*a*. The second supply port 41*b* of the second channel unit 27*b* includes the supply port 41 of the first supply manifold 40*a*, supply port 41 of the second supply manifold 40*b*, and supply port 41 of the third supply manifold 40*c* in the second channel unit 27*b*. A first return port 51*a* of the first channel unit 27*a* includes the return port 51 of the first return manifold 50*a*, return port 51 of the second return manifold 50*b*, and return port 51 of the third return manifold 50*c* in the first channel unit 27*a*. A second return port 51*b* of the second channel unit 27*b* includes the return port 51 of the first return manifold 50*a*, return port 51 of the second return manifold 50*b*, and return port 51 of the third return manifold 50*c* in the second channel unit 27*b*.

The sub-tank 15 includes the first sub-tank 15*a* and the second sub-tank 15*b* that differs from the first sub-tank 15*a*. The first sub-tank 15*a* and the second sub-tank 15*b* are connected to storage tanks 13 (FIG. 1) that differ from each other. The first sub-tank 15*a* is connected by the supply pipe 43 to the first supply port 41*a* of the first channel unit 27*a*, and is connected by the return pipe 44 to the first return port

51a of the first channel unit 27a. The second sub-tank 15b is connected by the supply pipe 43 to the second supply port 41b of the second channel unit 27b, and is connected by the return pipe 44 to the second return port 51b of the second channel unit 27b. As a result, the first channel unit 27a and second channel unit 27b through which liquids of storage tanks 13 differing from each other flow can be disposed in the same head 20 as each other. In this case, spacing of the nozzles 31 of the first channel unit 27a and nozzles 31 of the second channel unit 27b can be made smaller than when the first channel unit 27a and second channel unit 27b have been disposed in different heads 20 from each other. Hence, impact position of the liquid discharged by the nozzles 31 of the first channel unit 27a and impact position of the liquid discharged by the nozzles 31 of the second channel unit 27b can be adjusted with high precision.

The plurality of bypasses 60 include the first bypass 61, the second bypass 62, and the third bypass 63. Layout of the first bypass 61, second bypass 62, and third bypass 63 of the first channel unit 27a and layout of the first bypass 61, second bypass 62, and third bypass 63 of the second channel unit 27b are the same as each other. For example, in the examples of FIGS. 3 and 11, in the first channel unit 27a and second channel unit 27b, the first liquid channel 28a, the second liquid channel 28b, and the third liquid channel 28c are arranged from the rear in this order. Moreover, in the first channel unit 27a and second channel unit 27b, the first bypass 61 is connected to the first supply manifold 40a and second return manifold 50b, the second bypass 62 is connected to the third supply manifold 40c and first return manifold 50a, and the third bypass 63 is connected to the second supply manifold 40b and third return manifold 50c. Furthermore, in the first channel unit 27a and second channel unit 27b, the individual channel 30 is disposed further to the right than the first bypass 61 and third bypass 63, and the second bypass 62 is disposed further to the left than the first bypass 61 and third bypass 63. As a result, the same components can be utilized in manufacture of the first channel unit 27a and second channel unit 27b, and improvement in manufacturing efficiency and lowering of cost can be achieved.

<Other Modifications>

Figure 12:
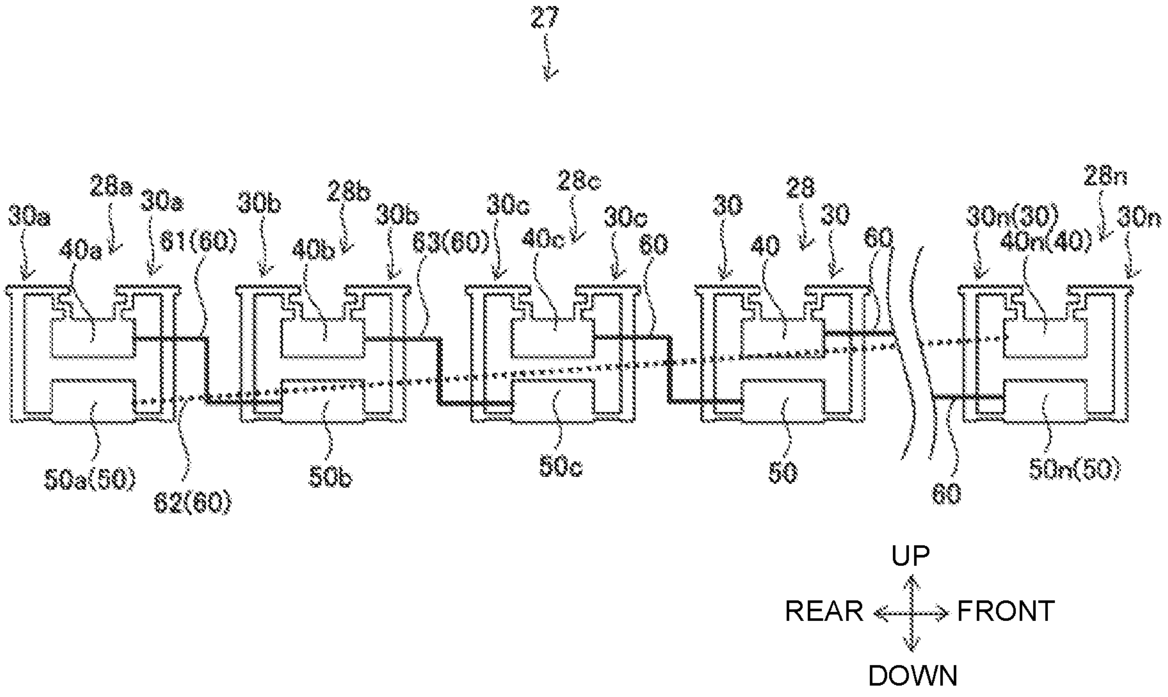
FIG. 12 is a diagram in which a channel unit of a liquid discharge apparatus according to another modification of the present teaching is viewed from the left.

In the above-described embodiment and all of the modifications, the channel unit 27 included three liquid channels 28. However, the number of liquid channels 28 in the channel unit 27 is not limited to this, and it may include more than three of the liquid channels 28. For example, as depicted in FIG. 12, the channel unit 27 includes n liquid channels 28. In this case, the channel unit 27 includes n bypasses 60. Of the n bypasses 60, (n-1) of the bypasses 60 are connected to the following supply manifold 40 and prior return manifold 50, of fellow mutually adjacent liquid channels 28, for example.

Among the n bypasses 60, the second bypass 62 being the one remaining bypass 60 is connected to the first return manifold 50a of the rearmost first liquid channel 28a and $n^{th}$ supply manifold 40n of the frontmost $n^{th}$ liquid channel 28n, of the n liquid channels 28 arranged in the front-rear direction. In this way, the supply manifold 40 and return manifold 50 of a certain liquid channel 28 are connected by the bypasses 60 one-on-one to mutually differing liquid channels 28. Therefore, uniformity of flowrate of liquid in the manifolds 40, 50 can be achieved while crosstalk is reduced.

Figure 13:
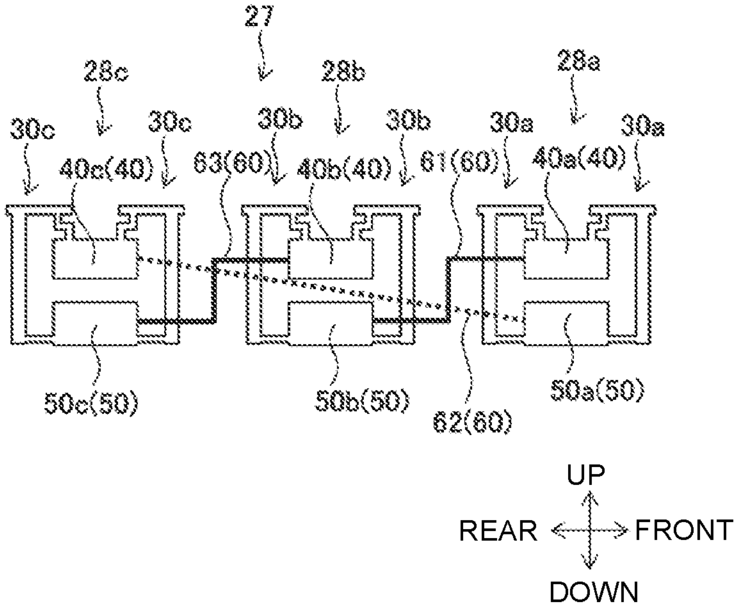
FIG. 13 is a diagram in which a channel unit of a liquid discharge apparatus according to still another modification of the present teaching is viewed from the left.

In the above-described embodiment and all of the modifications, in the channel unit 27, the first liquid channel 28a, second liquid channel 28b, and third liquid channel 28c were arranged from rear to front. However, an arrangement direction of the liquid channels 28 is not limited to this. For example, as depicted in FIG. 13, in the channel unit 27, the first liquid channel 28a, second liquid channel 28b, and third liquid channel 28c may be arranged from front to rear. In this case too, the first supply manifold 40a is connected via the first bypass 61, only to the second return manifold 50b. The first return manifold 50a is connected via the second bypass 62, only to the third supply manifold 40c. As a result, the supply manifold 40 and return manifold 50 of a certain liquid channel 28 are connected by the bypasses 60 one-on-one to mutually differing liquid channels 28. Therefore, uniformity of flowrate of liquid in the manifolds 40, 50 can be achieved while crosstalk is reduced.

In the above-described embodiment and all of the modifications, a line head system was adopted for the liquid discharge apparatus 10. However, the system adopted is not limited to this system, and, for example, another system such as a serial head system may be adopted too. In this serial head system, the liquid discharge apparatus 10 comprises a carriage that is installed with the head 20 and moves the head 20 in the left-right direction. The liquid discharge apparatus 10 alternately executes a recording operation to discharge liquid from the head 20 while moving the carriage and a conveying operation to convey the recorded medium A by the conveying device 17, and thereby executes print processing to print an image on the recorded medium A.

In the above-described embodiment and modifications, a system employing a piezoelectric element (a piezo system) was adopted for the head 20. However, the system adopted is not limited to this system. For example, a thermal system employing a heating element or an electrostatic system employing a conductive vibrating plate and electrodes may be adopted for the head 20.

The above-described embodiment and each of the modifications may be combined with each other unless mutually exclusive. Moreover, numerous improvements or other embodiments of the present teaching will be obvious to a person skilled in the art from the above description. Hence, the above description should be interpreted merely as an exemplification, and is provided with an object of teaching a person skilled in the art the best mode of carrying out the present teaching. Details of structure and/or function of the present teaching may be substantively changed in a range not departing from the spirit of the present teaching.

What is claimed is:

1. A liquid discharge apparatus comprising:

a plurality of liquid channels each including:

an individual channel having a nozzle;

a supply manifold connected to the individual channel to supply liquid to the individual channel; and a return manifold connected to the individual channel, the liquid that has not been discharged from the nozzle being flowed through the return manifold; and a plurality of bypasses each connected to the supply manifold and the return manifold to cause the liquid to flow therethrough, wherein the liquid channels include a first liquid channel, a second liquid channel, and a third liquid channel arranged in a first direction, the supply manifold included in the first liquid channel is connected only to the return manifold included in the second liquid channel, via a first bypass included in the bypasses, the return manifold included in the first liquid channel is connected only to the supply manifold included in the third liquid channel, via a second bypass included in the bypasses, and the supply manifold included in the second liquid channel is connected only to the return manifold included in the third liquid channel via a third bypass included in the bypasses.

2. The liquid discharge apparatus according to claim 1, wherein a cross-sectional area, of the second bypass, orthogonal to a flowing direction of the liquid is larger than the cross-sectional area, of the first bypass, orthogonal to the flowing direction and the cross-sectional area, of the third bypass, orthogonal to the flowing direction.

3. The liquid discharge apparatus according to claim 1, wherein the supply manifold and the return manifold extend in a second direction intersecting with the first direction, and a dimension, of the second bypass, in a third direction intersecting with the first direction and the second direction is larger than the dimension of the first bypass in the third direction and the dimension of the third bypass in the third direction.

4. The liquid discharge apparatus according to claim 1, wherein the supply manifold and the return manifold extend in a second direction intersecting with the first direction, the individual channel included in the first liquid channel is located on one side in the second direction with respect to the first bypass, and the individual channel included in the second liquid channel is located on the one side in the second direction with respect to the third bypass, and in the second direction, the second bypass is located between the first bypass and the individual channel included in the first liquid channel and between the third bypass and the individual channel included in the second liquid channel.

5. The liquid discharge apparatus according to claim 1, wherein the supply manifold and the return manifold extend in a second direction intersecting with the first direction, the individual channel included in the first liquid channel is located on one side in the second direction with respect to the first bypass, and the individual channel included in the second liquid channel is located on the one side in the second direction with respect to the third bypass, and the second bypass is located on the other side in the second direction with respect to both the first bypass and the third bypass.

6. The liquid discharge apparatus according to claim 1, further comprising a piezoelectric element configured to apply, to the liquid of the individual channel, a discharge pressure for discharging the liquid from the nozzle, wherein the supply manifold and the return manifold extend in a second direction intersecting with the first direction, the piezoelectric element, the supply manifold, and the return manifold are disposed in this order in a third direction intersecting with the first direction and the second direction, and each bypass of the plurality of bypasses is disposed in the same position as the supply manifold in the third direction, or in a position closer to the supply manifold than to the return manifold in the third direction.

7. The liquid discharge apparatus according to claim 1, further comprising a plurality of channel units each including the liquid channels and the bypasses, wherein the supply manifold included in one of the channel units is provided with a first supply port to which the liquid is supplied from a first tank, and the supply manifold included in another of the channel units is provided with a second supply port to which the liquid is supplied from a second tank.

8. The liquid discharge apparatus according to claim 7, wherein the bypasses included in the channel units respectively have the same layout as each other.

9. A liquid discharge apparatus comprising:

a plurality of liquid channels each including:
- an individual channel having a nozzle;
- a supply manifold connected to the individual channel to supply liquid to the individual channel; and
- a return manifold connected to the individual channel, the liquid that has not been discharged from the nozzle being flowed through the return manifold; and a plurality of bypasses each connected to the supply manifold and the return manifold to cause the liquid to flow therethrough, wherein the liquid channels include a first liquid channel, a second liquid channel, and a third liquid channel arranged in a first direction, the second liquid channel is arranged between the first liquid channel and the third liquid channel in the first direction, and the supply manifold included in the third liquid channel is connected to the return manifold included in the first liquid channel, via a bypass included in the bypasses.

10. The liquid discharge apparatus according to claim 9, further comprising a sub tank configured to store the liquid, wherein the supply manifold and the return manifold of each of the liquid channels are connected to the sub tank, the liquid is supplied from the sub tank to the supply manifold of each of the liquid channels, and the liquid is returned from the return manifold of each of the liquid channels to the sub tank.

* * * * *